United States Patent [19]
Klaue

[11] Patent Number: 5,287,701
[45] Date of Patent: Feb. 22, 1994

[54] AUTOIGNITION TWO-STROKE INTERNAL COMBUSTION ENGINE

[76] Inventor: Hermann Klaue, Tour D'Ivoire, CH-1820 Montreux, Switzerland

[21] Appl. No.: 984,893

[22] Filed: Dec. 2, 1992

[30] Foreign Application Priority Data

Jul. 16, 1992 [DE] Fed. Rep. of Germany ....... 4223393

[51] Int. Cl.$^5$ .............................................. F02B 33/44
[52] U.S. Cl. ...................................... 60/607; 60/624; 123/190.2
[58] Field of Search ...................... 60/605.1, 607, 608, 60/624; 123/190.2

[56] References Cited

U.S. PATENT DOCUMENTS

| | | | |
|---|---|---|---|
| 2,402,725 | 6/1946 | Birkigt | 60/608 |
| 2,730,088 | 1/1956 | Hyde | 123/190.2 |
| 3,007,302 | 9/1961 | Vincent | 60/607 |
| 3,727,485 | 4/1973 | Duerr | 60/607 |
| 4,926,642 | 5/1990 | Buthmann et al. | 60/607 |
| 4,989,410 | 2/1991 | Smith | 60/607 |
| 5,148,778 | 9/1992 | Klaue | 123/65 R |

Primary Examiner—Richard A. Bertsch
Assistant Examiner—Charles G. Freay
Attorney, Agent, or Firm—Herbert Dubno

[57] ABSTRACT

An autoignition two-stroke internal combustion engine utilizes rectangular working chambers and pistons with bar-type seals and rotary slide valves which connect the working chambers to exhaust gas turbines for secondary expansion and a supercharger. The supercharger is thermally decoupled from the expansion turbines but the expansion turbines are connected to the supercharger and the crankshaft by a planetary gear transmission which can be cut in or out by a disk-type brake or clutch.

9 Claims, 2 Drawing Sheets

AUTOIGNITION TWO-STROKE INTERNAL COMBUSTION ENGINE

FIELD OF THE INVENTION

My present invention relates to a two-stroke internal combustion engine with secondary expansion and supercharging and, in addition, autoignition. More particularly, the invention relates to an autoignition two-stroke internal combustion engine with secondary expansion and supercharging in which there is thermal decoupling between the exhaust gas expansion turbines and the supercharger or turbocompressor.

BACKGROUND OF THE INVENTION

For reference to an autoignition two-stroke internal combustion engine of the type which utilizes working chambers which have a generally rectangular cross section and pistons which also have a generally rectangular outline and operate with seals which lie in respective planes and are of the rib or bar type, reference may be had to my U.S. Pat. No. 5,148,778 issued Sept. 22, 1992.

In the two-stroke internal combustion engine field, it is known to provide rotary sleeve valves which serve for material exchange in the system, i.e. admitting fresh air to the working chamber as a combustion-sustaining gas and enabling exhaust gas formed in the combustion, ignition or explosion process to be discharged.

These systems alleviate the disadvantage of fresh-air loss in more conventional three-passage internal combustion engines in which the material exchange is effected exclusively by an appropriate travel to the combustion past passages in the wall of the respective working chamber.

It is also known to provide a two-stroke internal combustion engine with a centrifugal or turbocompressor which supplies the fresh air or fresh gas to flush the working chamber and for supercharging purposes.

It is also known to provide a high efficiency internal combustion engine by providing oscillating pistons in partial cylinders enabling a secondary expansion of the working gasses. In this case, diffusion of exhaust gas into fresh gas is intentionally provided to reduce $NO_x$ release which cannot be readily achievable with two-stroke engines operating with valves.

In four-stroke diesel and autoengines, turbo supercharging has been increasingly used in recent years. In this case, turbocompressors driven by exhaust gas are used to increase the filling of the working cylinder with the compressed air or the fuel/air mixture and thus bring about an improvement in power output and fuel efficiency. However, with these systems, there is a thermal coupling of the supercharger and the expansion turbine which requires an expensive supercharging air cooling.

It should also be mentioned that an additional exhaust gas turbine to increase power output has been provided heretofore and is coupled with the crankshaft by a transmission. This contributes to an overall efficiency increase of the engine. With diesel engines or trucks, it is possible to increase the overall efficiency in this manner to say 47%.

OBJECTS OF THE INVENTION

It is the principal object of my present invention to improve engine efficiency still further, to say, 50% or more and thereby avoid drawbacks of earlier systems.

More specifically it is an object of the present invention to provide an improved two-stroke internal combustion engine of the autoignition or self-ignition type with secondary expansion and supercharging which will have higher efficiency than could be expected heretofore while nevertheless utilizing a comparatively simple construction.

Another object of the invention is to provide an improved two-stroke engine of the type described which can operate with a reduced carbon oxide emission level and which simultaneously has a significantly reduced engine noise level.

Still another object of the invention is to provide an engine with reduced weight and fabrication cost.

SUMMARY OF THE INVENTION

These objects, and others which will become apparent hereinafter, are attained, in accordance with the invention in a two-stroke autoignition internal combustion engine of the secondary expansion and supercharging type which is characterized by the following features:

a. The working chambers are of rectangular cross section and cooperate with rectangular cross section or outline pistons reciprocatable in the working chambers and provided with bar-type seals lying in respective planes transverse to the direction of reciprocation of the piston;

b. On both sides of the working chambers, hollow rotary slide valves are provided for rotation about respective axes parallel to each other and to the crankshaft axis, one of the rotary sleeve valves associated with each working chamber being provided to supply fresh gas (e.g. air from the turbocharger) while the second rotary slide valve associated with each working chamber, discharges exhaust gas from the working chamber;

c. The material exchange (fresh gas for exhaust gas) is effected by the cooperation of rotary slide valve cutouts or openings and juxtaposed slits in the cylinder block defining the working chambers or the sleeves provided therein; and d. Secondary expansion is effected in one or more gas turbines which are thermally separated from the supercharger or compressor.

More particularly, the engine comprises:
an engine block formed with a plurality of working chambers of generally rectangular cross section configured to operate in an autoignition two-stroke cycle;
respective pistons of generally rectangular cross section reciprocatable in the working chambers upon ignition of a fuel/air mixture in the respective chambers to drive the pistons and producing an exhaust gas in the chambers, the pistons being sealed with respect to the working chambers by planar rib seals;
a crankshaft rotatable in the engine block and coupled with the pistons so as to be rotated by the pistons upon the pistons being driven by the ignition of the fuel/air mixture;
respective rotary sleeve valves flanking each of the working chambers, rotatable about axes parallel to an axis of the crankshaft and provided for feeding fresh air to and discharging exhaust gas from each working chamber, each of the rotary sleeve valve having openings cooperating with slits formed in the engine block;

a turbocompressor on the engine block connected with the rotary slide valves feeding fresh air to the cylinders for supercharging the engine;

at least one exhaust gas turbine on the engine block thermally separated from the turbocompressor and connected to at least one of the rotary slide valves discharging exhaust gas so as to be driven by exhaust gas therefrom; and gearing operatively coupling the exhaust gas turbine with the turbocompressor for driving the turbocompressor with the exhaust gas turbine.

According to a feature of the invention, therefore, the secondary expansion and turbocharging are effected in a manner which insures that they are thermally separate. The coupling of the secondary expansion and the supercharging can be effected through gearing which can be decoupled or deactivated.

During acceleration and hill travel, a higher output is generated with this system, the turbocharging being engaged with secondary expansion, whereas at normal speed, decoupling can be effected allowing the engine to be dimensioned smaller for a particular application and thus allow the engine to be designed to produce less $CO_2$.

BRIEF DESCRIPTION OF THE DRAWING

In the drawing described below, an example of a four-cylinder engine is provided with counter-reciprocating pistons and which can be used as the engine for a 40 ton traction load, for example a 40 ton truck.

The above and other objects, features and advantages of the present invention will become more readily apparent from the following description, reference being made to the accompanying drawing in which:

FIG. 3 is a timing diagram for the engine of FIGS. 1 and 2.

SPECIFIC DESCRIPTION

Figure 1:
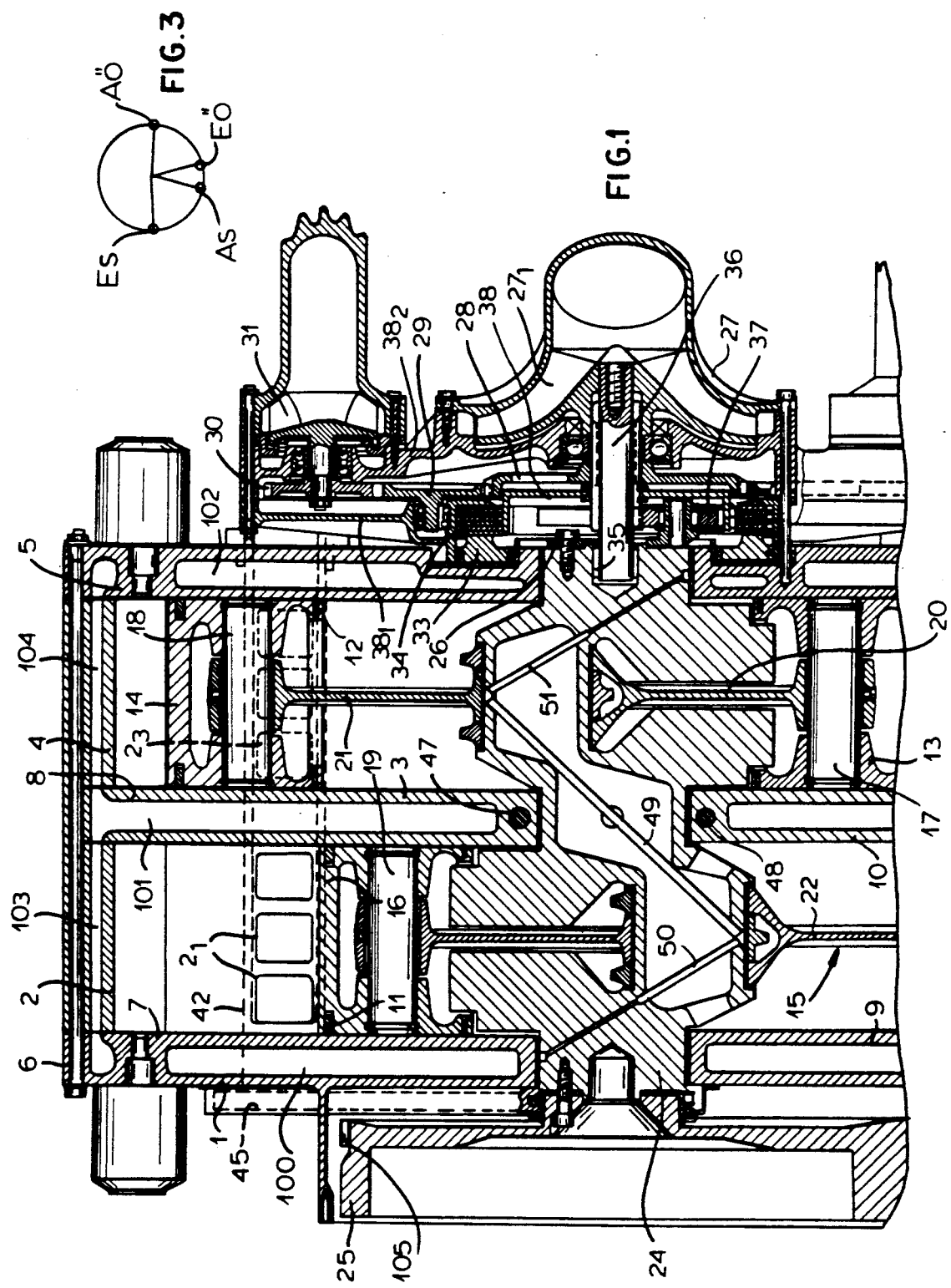
FIG. 1 is a partial cross sectional view through a portion of an engine according to the invention taken along the line I—I of FIG. 2.

In the drawing, I have shown an engine in which the block is assembled by drawbolts 6 from grey cast-iron cylinder block parts 1-5 which are cast hollow so as to form cooling water passages as represented generally at 100, 101, 102, 103, 104 in FIG. 1.

The cylinder block parts or slabs 1-5 define working chambers 7-10 which are of rectangular cross section (see the aforementioned patent) and receive rectangular outline pistons 13-16 which are reciprocatable in these working chambers and are sealed relative to the walls of the working chambers by bar-type seals as represented at 11 and 12. The bar-type seal around the periphery of a respective piston lies in a common plane, e.g. a plane perpendicular to the plane of the paper in FIG. i.

The pistons 13-16 are connected by pins 17, 18, 19 and connecting rods 20-23 with a crankshaft.

The pistons transfer the explosion or combustion force to the cast crankshaft 24 which is formed with a flywheel 25 and a gear 105 which can drive a pinion (not shown) forming the output to a transmission of the truck. The crankshaft 24 also has a planet carrier 26 attached thereto and forming one element of a planetary transmission which can be cut in or out and which serves to drive the supercharging compressor 27 which is connected by the gears 28-30 ($29_1$, $30_1$) with the exhaust gas turbines 31 and 32. These gears can form part of the planetary transmission described.

An annular piston 33 which can respond to the engine oil pressure, can act upon a lamella disk brake 34 juxtaposed with the planetary transmission and serving to cut the planetary transmission in or out.

The shaft 36 is journaled relative to the crankshaft in a roller bearing 35 and carries the impeller $27_1$ of the supercharger and is keyed to the gear 28 meshing with planet gear 29 on housing part $38_1$. The planet carrier 26 has planet wheels 37 meshing with external gearing on shaft 36 and with internal gearing of a bell 38 rotating on the shaft 36 and carrying the rotary plates of the disk brake 34. The stationary plates of the brake 34 are on housing part $38_1$.

If the brake 34 is actuated from the engine or transmission microprocessor through an appropriate valve, not shown, with the engine oil pressure, the planetary transmission can effect a connection to the supercharger via the gears 28-30, $29_1$, $30_1$ from the exhaust gas turbine 31, 32 in the flanged housing $38_1$, $38_2$. The supercharger-exhaust-gas turbine transmission is so constructed that, in this operating state, the excess power of the exhaust-gas turbines is fed to the crankshaft and thus the engine output, and the supercharging is so dimensioned that the engine operates at optimum efficiency.

When the brake 34 is not actuated, as will be apparent from FIG. 1, the turbine 31 driven by the exhaust gas, rotates gear 30 to drive the gear 29 and then gear 28 which is keyed to the shaft 36 and thus rotate the turbine $27_1$ of the turbocompressor 27. The gear 37 on the planet carrier 26 freewheels as does the bell 38 which carries the rotatable plates of the brake 34. The power of the exhaust gas turbines, therefore, serves only to drive the supercharger.

The engine material exchange is effected with the pattern illustrated in FIG. 3 utilizing the openings 40-43 in the four rotary slide valves and cooperating with the slits $2_1$, $2_2$, $2_3$, $2_4$ in the walls of the working chambers 7-10 which provide a large time cross section. The Figure shows at $A_o$ and $A_s$ the opening and closing of the outlets and at $E_o$ and $E_s$ the opening and closing of the inlets.

The diagonally opposite rotary sleeve valves 40 and 43 receive compressed air via the ducts $52_1$ and $52_2$ from the supercharger 27. The rotary sleeve valves 41 and 42 with their oppositely oriented outlets feed through the short ducts $53_1$ and $53_2$ the gas turbines 31 and 32 with exhaust gas. Thus a symmetrical charging of the four working chambers operating in the two-stroke cycle is ensured.

In the embodiments shown, the rotary sleeve valves are driven from the crankshaft by a roller chain 45 (forming the timing chain) which also drives oil pump 46. The oil pump is mounted in a bearing bracket which is fastened by the anchor 47, 48 to the central block member 3. Lubrication of the crankshaft bearings is here effected through tubes 49-51 pressed into the cast crankshaft.

In addition to the advantages described, the two-stroke engine has the advantage of minimal $NO_x$ release because of the flushing effected through the rotary slide valve. Since there is no cylinder head provided with valves in this system, the combustion chamber can have the fuel injected via the nozzles 24 shortly before the upper center positions are reached by the pistons and thus can employ high pressure injection from nozzles controlled by the process.

The gearing can have a transmission ratio between input and output sides such that the exhaust gas turbine, the turbo-compressor and gearing, with the gearing inactive at an operating speed of the engine generate a supercharging pressure of the turbocompressor which is greater than that produced with the gearing being active.

Figure 2:
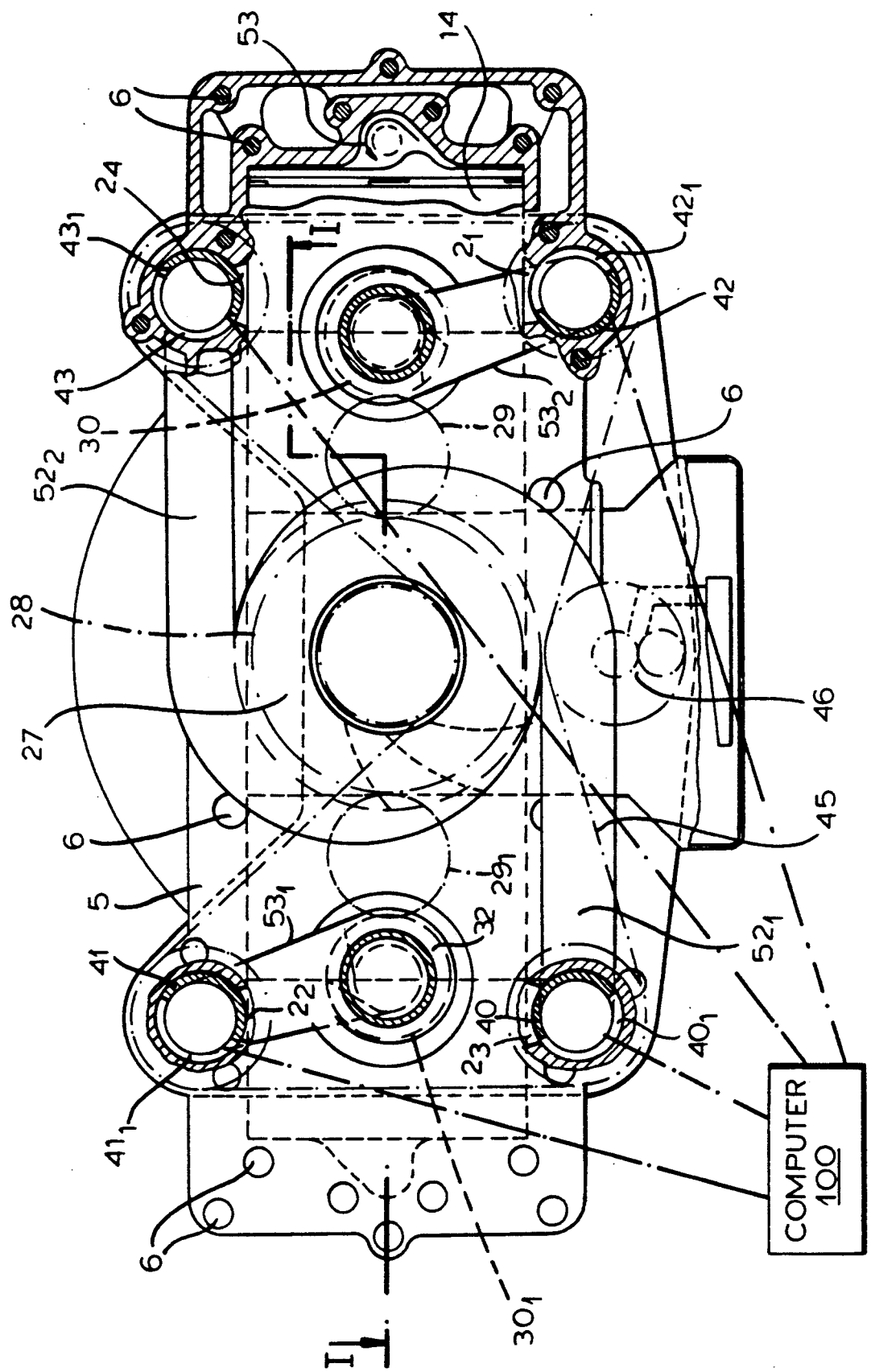
FIG. 2 is an end view of the engine of FIG. 1 seen from the right band side thereof, but partially broken away in various regions.

In FIG. 2, moreover, I show at 100, a computer operatively connected to the rotary sleeve valves for controlling engine timing in dependence upon engine load and speed.

Soot formation is excluded because the hot cylinder walls ensure an intensive cylindrical vortex of the fuel particles as indicated at 53 in FIG. 2.

I claim:

1. An autoignition two-stroke internal combustion engine, comprising:
    an engine block formed with a plurality of working chambers of generally rectangular cross section configured to operate in an autoignition two-stroke cycle;
    respective pistons of generally rectangular cross section reciprocatable in said working chambers upon ignition of a fuel/air mixture in the respective chambers to drive said pistons and producing an exhaust gas in said chambers, said pistons being sealed with respect to said working chambers by planar rib seals;
    a crankshaft rotatable in said engine block and coupled with said pistons so as to be rotated by said pistons upon said pistons being driven by said ignition of said fuel/air mixture;
    respective rotary sleeve valves flanking each of working chambers, rotatable about axes parallel to an axis of said crankshaft and provided for feeding fresh air to and discharging exhaust gas from each working chamber, each of said rotary slide valve having openings cooperating with slits formed in said engine block;
    a turbocompressor on said engine block in fluid connection with the rotary sleeve valves feeding fresh air to said chambers for supercharging the engine;
    at least one exhaust gas turbine on said engine block thermally separated from said turbocompressor and in fluid connection with at least one of the rotary slide valves discharging exhaust gas so as to be driven by exhaust gas therefrom;
    gearing operatively coupling said exhaust gas turbine mechanically with said turbocompressor for driving said turbocompressor with said exhaust gas turbine;
    planetary transmission provided between said turbocompressor and said crankshaft; and
    a friction device for selectively activating and inactivating said planetary transmission.

2. The engine defined in claim 1 wherein said friction device is a brake.

3. The engine defined in claim 1 wherein said gearing has a transmission ratio between input and output sides thereof such that the exhaust gas turbine, the turbocompressor and the gearing are so constructed that, with the gearing inactive at an operating speed of the engine, a supercharging pressure of said turbocompressor is generated which is greater than that produced with said gearing being active.

4. The engine defined in claim 1 wherein said rotary sleeve valves are driven by chains from said crankshaft.

5. The engine defined in claim 1, further comprising a computer operatively connected to said rotary sleeve valves for controlling engine timing in dependence upon engine load and speed.

6. The engine defined in claim 1 wherein said pistons are paired for movement opposite one another in paired working chambers, each working chamber pair being provided with a respective exhaust gas turbine, said turbocompressor serving all of said pairs of working chambers and being located at the crankshaft axis.

7. The engine defined in claim 1 wherein said rotary sleeve valves are located reciprocally on opposite sides of said engine block.

8. An autoignition two-stroke internal combustion engine, comprising:
    an engine block formed with a plurality of working chambers configured to operate in an autoignition two-stroke cycle;
    respective pistons reciprocatable in said working chambers upon ignition of a fuel/air mixture in the respective chambers to drive said pistons and producing an exhaust gas in said chambers;
    a crankshaft rotatable in said engine block and coupled with said pistons so as to be rotated by said pistons upon said pistons being driven by said ignition of said fuel/air mixture;
    valve means communicating with said working chambers for feeding fresh air to and discharging exhaust gas from each working chamber;
    a turbocompressor on said engine block connected with said valve means feeding fresh air to said chambers for supercharging the engine;
    a planetary transmission between said turbocompressor and said crankshaft, and including a friction device for selectively activating and inactivating said planetary transmission so that with activation of said planetary transmission, excess power developed at said turbine is delivered to said crankshaft and upon inactivation of said planetary transmission, supercharging of the engine is increased for passing or hill climbing.

9. The engine defined in claim 10 wherein said friction device is a brake.

* * * * *